(12) United States Patent
Rye

(10) Patent No.: US 9,072,286 B1
(45) Date of Patent: Jul. 7, 2015

(54) FISHING LURE WITH TAIL WING

(71) Applicant: Ryan Patrick Rye, Lawrenceville, GA (US)

(72) Inventor: Ryan Patrick Rye, Lawrenceville, GA (US)

( * ) Notice: Subject to any disclaimer, the term of this patent is extended or adjusted under 35 U.S.C. 154(b) by 0 days.

(21) Appl. No.: 14/269,178

(22) Filed: May 4, 2014

(51) Int. Cl.
  *A01K 85/16* (2006.01)
  *A01K 85/14* (2006.01)

(52) U.S. Cl.
  CPC *A01K 85/16* (2013.01); *A01K 85/14* (2013.01)

(58) Field of Classification Search
  USPC ............ 43/42, 42.02, 42.11, 42.24, 42.26, 43/42.28, 42.45, 42.48
  IPC ............ A01K 85/00,85/14, 85/16
  See application file for complete search history.

(56) References Cited

U.S. PATENT DOCUMENTS

| | | | |
|---|---|---|---|
| 3,218,750 A * | 11/1965 | Lewin | 43/42.28 |
| 3,842,528 A * | 10/1974 | Hish | 43/43.13 |
| 3,879,882 A | 4/1975 | Rask | |
| 3,898,758 A * | 8/1975 | Swanningson | 43/42.48 |
| D263,988 S * | 4/1982 | Williams, Jr. | D22/133 |
| 4,744,168 A * | 5/1988 | McClellan | 43/42.24 |
| D299,263 S * | 1/1989 | James | D22/133 |
| 5,193,299 A * | 3/1993 | Correll et al. | 43/42.47 |
| D350,382 S * | 9/1994 | Mann | D22/133 |
| 5,381,623 A * | 1/1995 | Crisp | 43/42.43 |
| 6,073,383 A * | 6/2000 | Line | 43/42.24 |
| 6,860,058 B2 * | 3/2005 | Ito | 43/42.28 |
| 7,080,476 B2 | 7/2006 | King | |
| 7,774,974 B1 * | 8/2010 | Parks | 43/42.28 |
| D682,386 S * | 5/2013 | Olguin | D22/131 |
| 8,490,319 B2 * | 7/2013 | Mancini et al. | 43/42.09 |
| 2003/0066231 A1 * | 4/2003 | Ollis et al. | 43/42.24 |

* cited by examiner

Primary Examiner — Christopher Harmon

(57) ABSTRACT

A fishing lure consists of a body member and a flexible tail member. The tail member has a leading edge and a trailing edge, both extending from the body member and terminating at a common bend apex of the tail member. A wing feature is located adjacent to the common bend apex and is positioned between the leading edge and trailing edge. The wing feature is generally oriented such that the leading face of the wing feature is angled forward, or into the direction of oncoming water flow around the moving lure. The predetermined relative geometry of the tail member and wing feature enables a significant oscillating motion of the tail member while simultaneously and uniquely providing a means for the lure to swim either generally deeper or shallower, depending on an angler-chosen mounting orientation of the lure onto a pre-existing weighted hook.

20 Claims, 8 Drawing Sheets

FISHING LURE WITH TAIL WING

BACKGROUND INFORMATION

This disclosure relates to fishing lures. More specifically, this disclosure relates to a lure comprising a flexible tail, wherein a unique wing feature is located near an outer tip of the flexible tail. The wing feature enables an amplified oscillating motion of the tail and also enables an upward or downward swimming direction of the lure, depending on the angler-chosen, hook-mounted orientation in which the lure is retrieved in water. The result is a lure that can easily be fished at shallower or deeper depths while simultaneously exhibiting a unique and substantial side-to-side swimming motion.

Lures with oscillating, flexible tail members are well known. Lures with rearward-extending tail stabilizer features, lures with spherically-tipped tails, and lures with long, flanged perimeter edges designed to disrupt water flow around the trailing surface area of the tail are common existing lure designs. However, a generally V-shape, U-shaped, or C-shaped asymmetric tail comprising a forwardly-angled wing feature located at the intersection of a tail leading edge and a trailing edge offers the advantages of generating a more significant oscillating tail motion while simultaneously providing for multiple mounting orientations of the lure onto a pre-existing weighted hook. Such various mounting orientations enable the lure to generally swim at a shallower or deeper depth when pulled through water, depending on angler preference.

SUMMARY OF THE INVENTION

A fishing lure consists of a body member having an asymmetric, flexible tail member. The tail member further comprises a leading edge and a trailing edge converging at an outer tip of the tail, or first bend apex, and a wing feature is positioned at the first bend apex and is generally perpendicular to the tail member surface. When the lure is retrieved by an angler, the hydrodynamic forces acting on the wing feature cause the first bend apex to move backward or be pushed in a more rearward direction, and as a result the swept-back wing angle of the wing feature supplies either an upward or downward force onto the hook-mounted lure as long as the lure continues to move forward. Depending on how an angler orients the lure on the hook, this upward force, or downward force, helps keep the lure either moving along the top-water surface, or swimming at a deeper underwater depth, respectively. Simultaneously, the generally flat tail member surface oscillates with a significant side-to-side swimming motion while also helping keep the moving lure in a stable and upright orientation.

Objects and advantages of the fishing lure with tail wing are as follows:
1. The hydrodynamic forces acting on the wing feature enable the asymmetric tail member to generate an extremely lifelike and substantial amount of fish-attracting oscillating-type motion, without the lure spiraling uncontrollably or exhibiting a corkscrew-type motion underwater.
2. The wing feature allows an angler to choose whether he or she fishes the lure at a deeper depth, or shallower depth, depending on whether or not the lure is intentionally mounted to a hook such that the swept-back leading face of the wing feature on a moving lure generally faces up towards the water surface, or down away from the water surface, respectively.

These and other objects and advantages will become readily apparent upon review of the following specification and drawings.

DRAWINGS

Figure 1A:
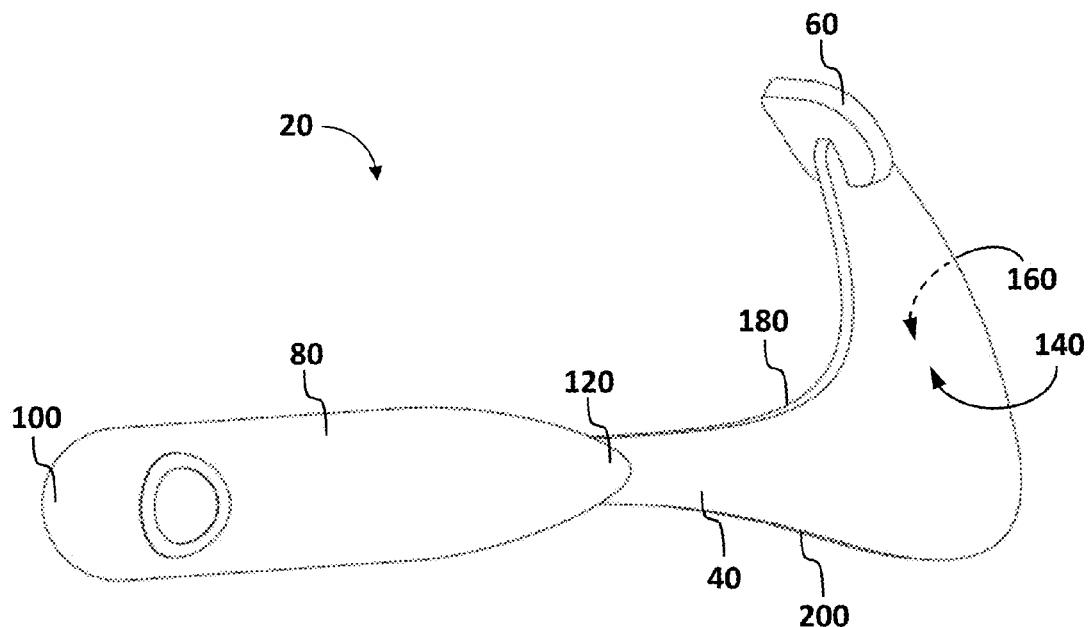
FIG. 1A is a diagrammatic perspective view a first preferred embodiment of a fishing lure with tail wing feature, in accordance with the present invention.

Reference Numerals 20 lure
40 tail member
60 wing feature
80 body member
100 leading end
120 trailing end
140 first side face
160 opposite side face
180 leading edge
200 trailing edge
220 leading face
240 trailing face
260 median plane
280 body member transverse dimension
300 tail member transverse dimension
320 wing feature transverse dimension
340 first attachment point
360 first bend apex
380 second attachment point
400 second bend apex 420 frontal plane
440 dividing plane
460 first region
480 second region
500 first endpoint
520 second endpoint
540 wing plane
560 wing angle
580 fish-attracting element
600 weighted hook
620 fishing line
640 eyelet
660 sharp point
680 weighted head
700 top water surface
720 gravitational force
740 forward direction
760 rearward direction
780 incident hydrodynamic pressure
800 downward swimming direction
820 trailing edge oscillation
840 leading edge oscillation
860 upward swimming direction
880 first dimension
900 second dimension
920 first width dimension
940 second width dimension

DETAILED DESCRIPTION OF PREFERRED EMBODIMENTS

FIGS. 1A-1D illustrate a first preferred embodiment of a fishing lure 20 with a tail member 40 having a wing feature 60. Generally, the lure 20 comprises a body member 80 having a leading end 100 and a trailing end 120, along with at least one tail member 40 extending from a location along the body member 80 and comprising at least one wing feature 60. A transverse cross-section of the body member 80 can be tubular in shape or comprise a first body thickness dimension generally equal to a second body thickness dimension, with the second body thickness dimension generally perpendicular to the first body thickness dimension. The most common material used for both the body member 80 and tail member 40 is an elastomeric or stretchable material, although the body member 80 can be made from a rigid material such as wood, metal, or plastic, while the tail member 40 can be a flexible plastic or elastomeric material. As shown by the arrows in FIG. 1A, the tail member 40 comprises a first side face 140 and an opposite side face 160. A leading edge 180 and a trailing edge 200 separate the two side faces from one another, with both the leading edge 180 and trailing edge 200 extending from the trailing end 120 of the body member 80. The leading edge 180 and trailing edge 200 generally converge near the wing feature 60, and the wing feature 60 generally protrudes in a perpendicular fashion relative to the side face surfaces of the tail member 40.

Figure 1B:
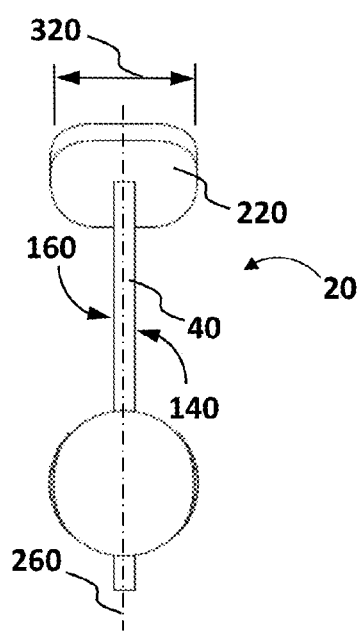
FIG. 1B is a diagrammatic front view of the first preferred embodiment of FIG. 1A.
Figure 1C:
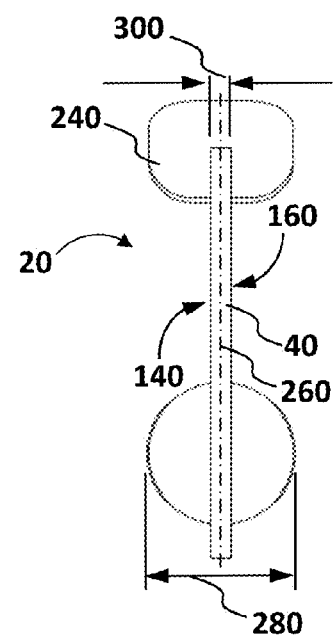
FIG. 1C is a diagrammatic rear view of the first preferred embodiment of FIG. 1A.

As further detailed in the front view of FIG. 1B and the rear view of FIG. 1C, a median plane 260 divides substantially most or all of the tail member 40 into generally equal portions. A body member transverse dimension 280 is generally larger than a tail member transverse dimension 300, and the tail member transverse dimension 300 is desirably smaller than a wing feature transverse dimension 320, with each thickness or transverse dimension being measured generally perpendicular to the median plane 260. It should be further noted that the wing feature transverse dimension 320 can be larger than, smaller than, or equal to the body member transverse dimension 280.

Figure 1D:
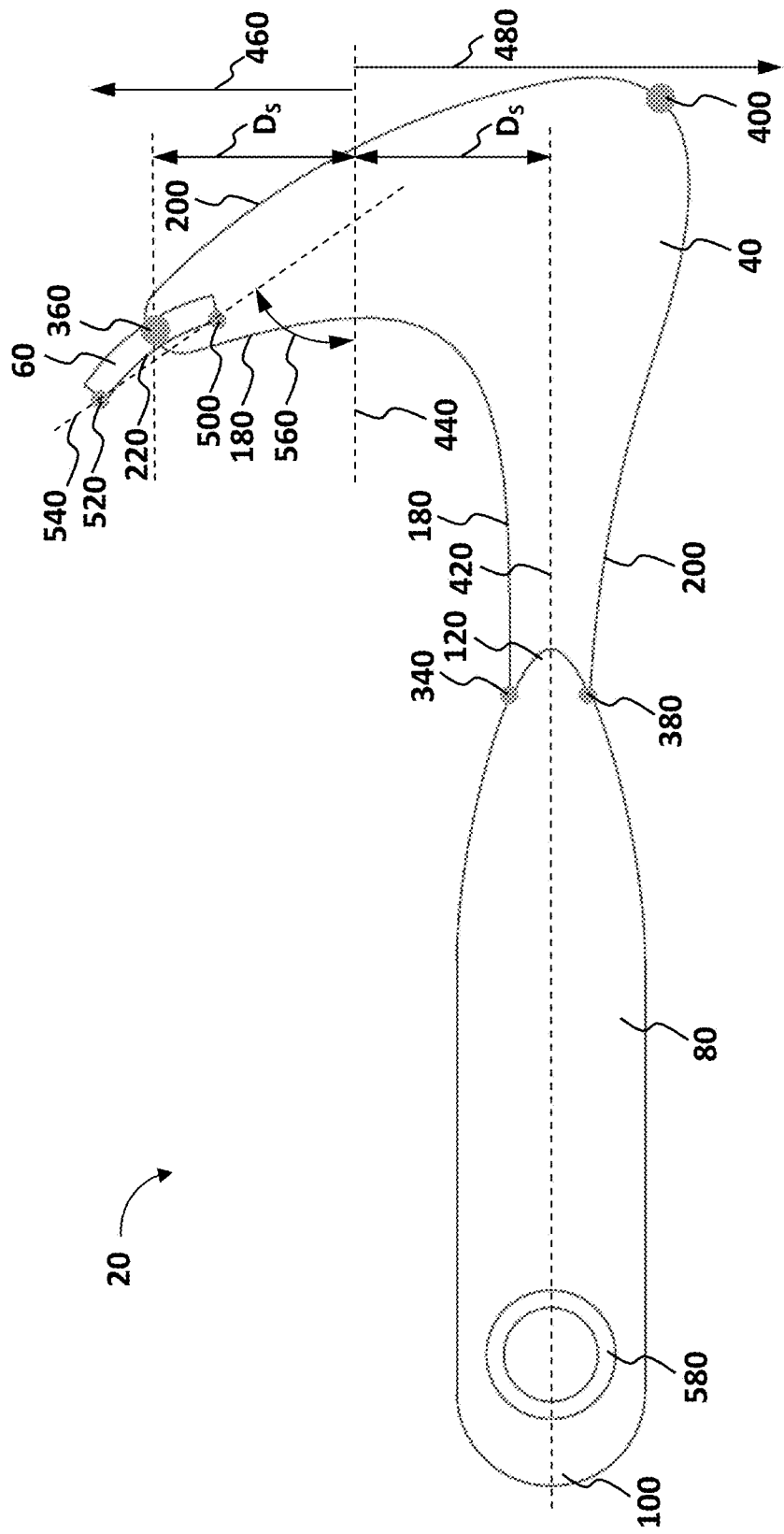
FIG. 1D is a diagrammatic side view of the first preferred embodiment of FIG. 1A.

FIG. 1D is a first side view of the first preferred embodiment and more completely characterizes the required geometry of the lure 20 for both enabling a substantial oscillating motion of the tail member 40 and simultaneously enabling an angler-chosen rising or diving motion of the lure 20. The leading edge 180 of the tail member 40 extends from a first attachment point 340 on the body member 80, has a generally steepening profile or generally increasing slope, and terminates at a first bend apex 360. The trailing edge 200 of the tail member 40 extends from a second attachment point 380 on the body member 80 and also terminates at the first bend apex 360. The trailing edge 200 contains at least one substantial second bend apex 400 located between the second attachment point 380 and the first bend apex 360. Typically, this second bend apex 400 is positioned at a portion of the trailing edge 200 located generally rearward of the first bend apex 360, and the second bend apex 400 is generally located at a relative maximum distance away from the first bend apex 360 as compared to any other point within the rearward portion of the tail member 40, or any other point generally rearward of the first bend apex 360. The second bend apex 400 can be alternately described as the general location wherein a slope of, or general profile shape of, the trailing edge 200 undergoes its most abrupt or most significant change between the second attachment point 380 and the first bend apex 360.

A frontal plane 420 is also defined, and the frontal plane 420 is perpendicular to the median plane 260 described in FIG. 1B. The frontal plane 420 generally passes through the leading end 100 of the body member 80 and also passes approximately midway between the first attachment point 340 and second attachment point 380. A dividing plane 440 can then be drawn parallel to the frontal plane 420 and located generally midway or halfway between the first bend apex 360 and the frontal plane 420, thus creating a pair of equally-spaced dimensions, each labeled $D_S$ in FIG. 1D. More importantly, the dividing plane 440 divides the tail member 40 and surrounding water, i.e. the underwater three dimensional space including the lure 20, into a first region 460 and a second region 480, with the frontal plane 420 clearly lying within the second region 480 of the three dimensional space, and the wing feature 60 clearly located within the first region 460 of the three dimensional space. Note that while the most popular location for the first attachment point 340 and second attachment point 380 is at or near the trailing end 120 of the body member 80, a lure 20 can exist wherein multiple appendages extend from various locations along the body member 80, each appendage having the geometry of a tail member 40 described herein and each having its own pair of "first attachment point 340 and second attachment point 380" joining locations to the body member 80. For example, a frog-shaped lure 20 can comprise two small arms and two long legs, with any or all of the arms and legs having the tail member shape and wing feature geometry described and taught herein. FIG. 1D also illustrates a first width dimension 920 of the tail member 40 and a second width dimension 940 of the tail member 40. The first width dimension 920 is defined as the straight-line distance between the first attachment point 340 and second attachment point 380, as measured perpendicular to the frontal plane 420. The second width dimension 940 is defined as the distance between the leading edge 180 and trailing edge 200 at a location coincident with the dividing plane 440. From observing the relative lengths of the first width dimension 920 and second width dimension

940 in FIG. 1D, it is clear that the second width dimension 940 is larger than the first width dimension 920.

In order to generate the desired amplification of the tail oscillations and also optimally enable the angler-chosen rising or diving swimming behavior of the lure 20, the wing feature 60 must be contained within the first region 460 and not the second region 480. In other words, if the wing feature 60 is either wholly located within the second region 480 or extends substantially into the second region 480, then such a geometric arrangement between the wing feature 60 and side surfaces of the tail member 40 does not create the desired amplitude of tail member 40 oscillations nor enable the desired angler-chosen diving or rising behavior that results from having the wing feature 60 substantially or wholly contained within the first region 460. Further benefits and reasons for such a first-region location for the wing feature 60 are discussed shortly in the supporting text of FIGS. 2A-3.

For better enabling the desired tail oscillations coupled with the desired diving or rising swimming behavior of the lure 20, the first bend apex 360 or a portion of the wing feature 60 is located generally further away from the dividing plane 440 than any other portion of the first side face 140 and opposite side face 160 of the tail member 40 that is contained within the first region 460. Note that at least a portion of the trailing edge 200 in the second region 480 is generally located more rearward or behind the wing feature 60, with the "rearward" direction defined herein by a geometric ray originating at the leading end 100 of the body member 80 and extending through the trailing end 120 of the body member 80. In addition, it is advantageous if the "trailing volume" or space directly behind or directly rearward of the wing feature 60 in the first region 460 is generally empty and void of any substantial side face surface area of the tail member 40. In other words, having a substantial surface portion of the tail member 40 positioned substantially and directly behind the wing feature 60 or extending immediately rearward of the wing feature 60 in the same first region 460 would cause such a first-region surface extension of the tail member 40 to interfere with the oscillating-induced vortices that are formed underwater immediately behind the wing feature 60, and the resulting oscillations of the tail member 40 in the second region 480 would not be as desired. Said differently, a mass and side surface area of any such substantial tail-member side surface area extending rearward directly behind the wing feature 60 in the first region 460 would act to undesirably interfere with or resist the oscillating-producing flow of water around the wing feature 60. As a result, it is advantageous to keep the trailing volume or space within the first region 460 immediately rearward of the wing feature 60 free from any significant portion of, or significant rearward extension of, the side surfaces of the tail member 40.

In addition to assigning a preferred region of the tail member 40 for the wing feature 60 location, an optimum angular orientation of the wing feature 60 can be defined relative to the dividing plane 440. The line created by the intersection of the leading face 220 of the wing feature 60 and the median plane 260 defines a first endpoint 500 and a second endpoint 520, and a wing plane 540 can then be drawn through the first endpoint 500 and the second endpoint 520, with the wing plane 540 being generally perpendicular to the median plane 260, or with the wing plane 540 being generally perpendicular to the side faces of the tail member 40. A resulting wing angle 560 is then defined between the wing plane 540 and dividing plane 440. In order to generate a significant lifting or diving force on the body member 80, the geometry of the tail member 40 and wing feature 40 should be chosen such that the wing angle 560 is generally 120 degrees or smaller when the lure 20 is at rest. In the case of a larger or heavier body member 80, the wing angle 560 should be generally limited to being 80 degrees or smaller when the lure 20 is at rest, in order to produce a relatively sufficient lifting or diving force on the body member 80. Note that the wing angle 560 is contained within the first region 460 and generally faces towards—or is opens towards—the leading end 100 of the body member 80. Lastly, it should be noted here that an example of a fish-attracting element 580 is shown in FIG. 1D as an eye feature located on the surface of the body member 80.

Figure 2A:
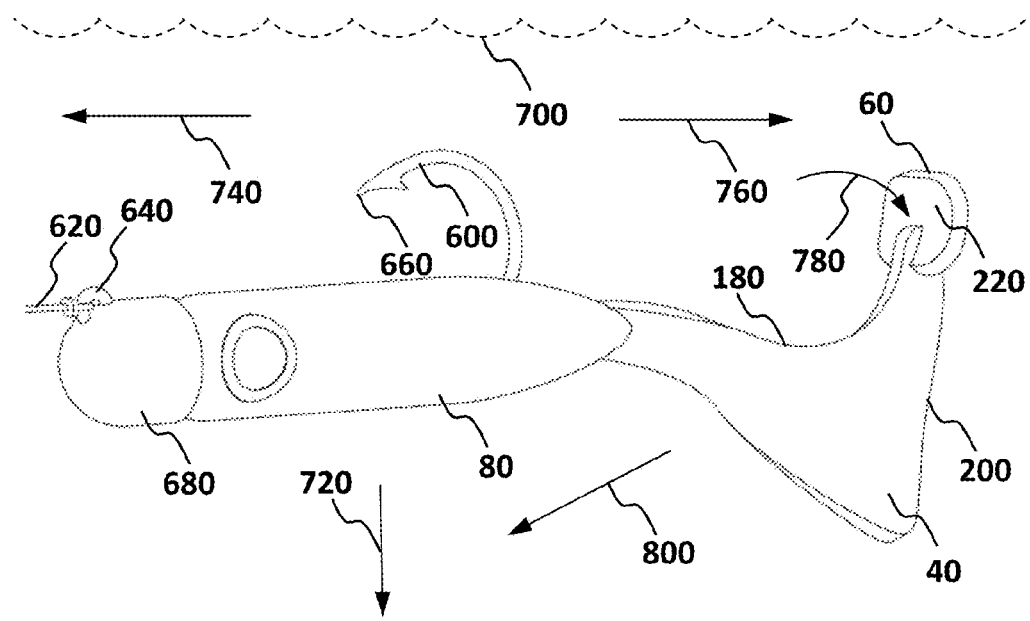
FIG. 2A is a diagrammatic perspective view of the first preferred embodiment attached in a first mounting orientation onto a pre-existing weighted hook.
Figure 2B:
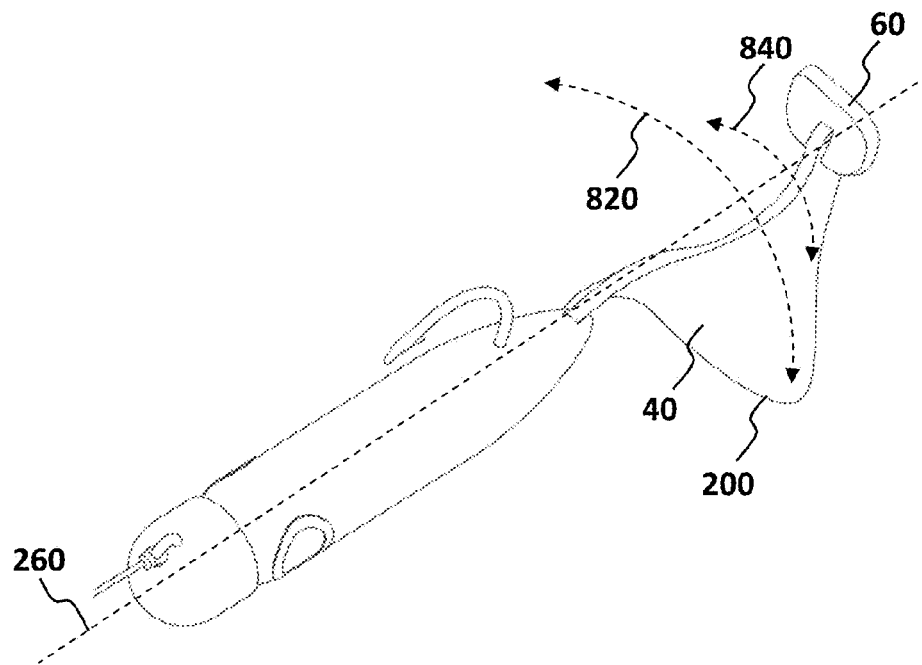
FIG. 2B is an alternate diagrammatic perspective view of the arrangement of FIG. 2A.

In FIG. 2A, the preferred embodiment of the lure 20 from FIGS. 1A-1D is shown attached to or slid onto to a pre-existing weighted hook 600 in a first mounting orientation and shows an instantaneous snapshot of the appearance of the rearward-flexed or oscillating tail member 40, as it could momentarily appear as the lure 20 was being pulled by a fishing line 620 through water. A pre-existing weighted hook 600, or weighted jig-head, is a common mounting method for such a lure 20, and the weighted hook 600 comprises a stiff wire hook having an eyelet 640 at one end and a sharp point 660 at an opposite end. The stiff wire hook is partially embedded into a metallic weighted head 680, and the weighted head 680 helps increase the casting distance of the lure 20. In FIG. 2A, the top water surface 700 is depicted as dotted lines, and the top water surface 700 is drawn in an approximate relative location above the lure 20 in order to help illustrate the orientation of the lure 20 relative to both the water surface and a gravitational force 720 as the lure 20 moves through water. This first mounting orientation of FIG. 2A is one wherein the leading face 220 of the rearward-bent wing feature 60 is generally facing upwards or angled towards the top water surface 700. Again, in FIG. 2A, the lure 20 is shown being pulled through the water in a forward direction 740, which is equivalent to stating that water is flowing past the lure 20 in a rearward direction 760. The incident hydrodynamic pressure 780 acting on the wing feature 60 results in a hydrodynamic force that acts to push the wing feature 60 down or away from the top water surface 700 as shown in FIG. 2A, and the hydrodynamic force also acts to cause the leading edge 180 become more elongated or more straight while the lure 20 is moving than when the lure 20 is at rest. The incident hydrodynamic pressure 780 pushing down on the wing feature 60 in FIG. 2B further causes a slight downward swimming direction 800 of the lure 20. Said differently, the hydrodynamic forces acting on the wing feature 60 cause the lure 20 to swim in a direction generally towards the second region 480 that was first introduced in FIG. 1D. This deeper swimming depth enables an angler to keep the tail member 40 of the moving lure 20 desirably oscillating within a deeper strike zone until the angler naturally pulls the lure 20 out of the water near the end of any given "cast and retrieve" cycle. With the leading edge 180 now more bent rearward and more straight relative to its "at rest" shape, the trailing edge 200 is forced to oscillate, or forced to alternately buckle and flex outward a substantial distance on either side of the median plane 260, as shown in FIG. 2B. As long as the lure continues to move forward, the incident hydrodynamic pressure 780 constantly pushes down on the wing feature 60 and creates a more substantial trailing edge oscillation 820 as compared to a leading edge oscillation 840. The unique geometric relationships and requirements between the tail member 40 and wing feature 60 described herein enable an extremely large amount of tail member oscillation without causing the lure 20 to exhibit an undesirable spiral swimming behavior or spin out of control when retrieved.

Figure 3:
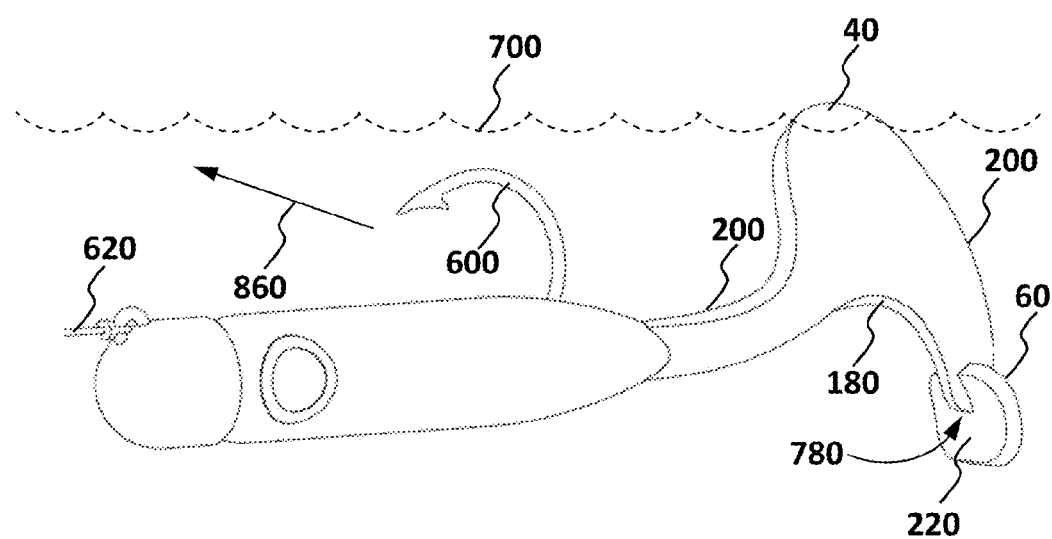
FIG. 3 is a diagrammatic perspective view of the first preferred embodiment attached in a second mounting orientation onto a pre-existing weighted hook.

In FIG. 3, the lure 20 again is mounted to the same pre-existing weighted hook 600 that was introduced and shown in FIGS. 2A-2B. However, the lure 20 is now oriented or attached onto the weighted hook 600 in a second, upside-down mounting orientation, or spun generally 180 degrees from the lure orientation of FIGS. 2A-2B. More precisely, the leading face 220 of the bent-back wing feature 60 now faces relatively downward, or generally away from, the top water surface 700. The relative oscillations of the leading edge 180 and trailing edge 200 are similar to that described in FIGS. 2A-2B, but now the lure 20 experiences a slight lifting force and exhibits a generally upward swimming direction 860 as it is retrieved by an angler. The faster the lure 20 is pulled forward in water, the more swept back the leading face 220 of the wing feature 60 becomes, and the more the swept back angle of the wing feature 60 helps push the lure 20 upwards and keep the lure 20 suspended and moving along the top water surface 700. Since this second mounting orientation of the lure 20 onto the weighted hook 600 causes the lure 20 to want to swim upwards, the lure orientation in FIG. 3 is best suited for a "top water style" presentation and retrieve of the lure 20. The tail member 40 in FIG. 3 can oscillate near, or partially exposed above, the top water surface 700 and can generate fish-attracting sloshing or gurgling sounds as long as the lure 20 continues to move forward, with such forward movement in turn sustaining the forces from incident hydrodynamic pressure 780 that continue to push upward on the wing feature 60 and help keep the lure 20 moving along the top water surface 700. It should be noted in comparing FIG. 2B and FIG. 3 that the desired tail member oscillations of a moving lure 20 always occur as long as the lure 20 moves forward. Said differently, the desired tail member oscillations occur independently of the angler-chosen mounting orientation of the lure 20 onto the pre-existing weighted hook 600. The angler-chosen mounting orientation simply helps determine the swimming direction towards which the hook-mounted lure will prefer to move, with said swimming direction being generally towards the second region 480.

Figure 4A:
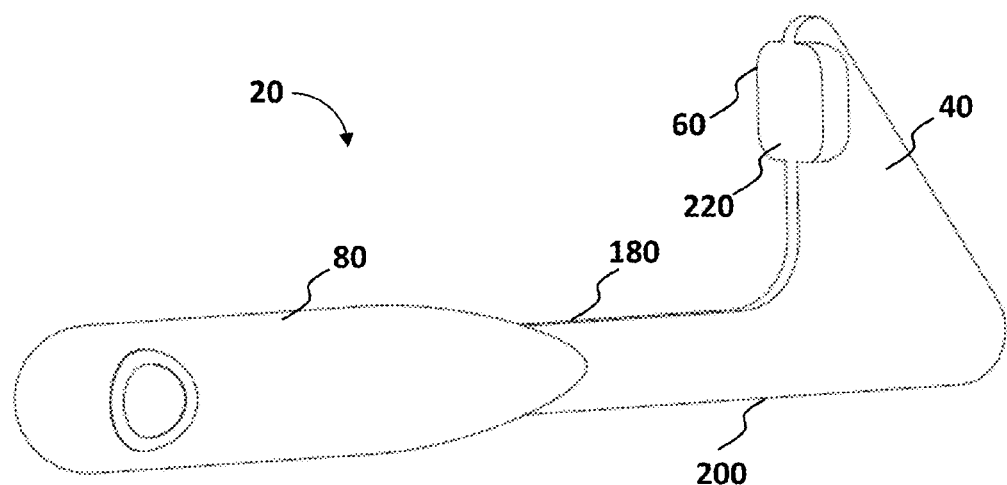
FIG. 4A is a diagrammatic perspective view of a second preferred embodiment of a fishing lure with tail wing feature, in accordance with the present invention.
Figure 4B:
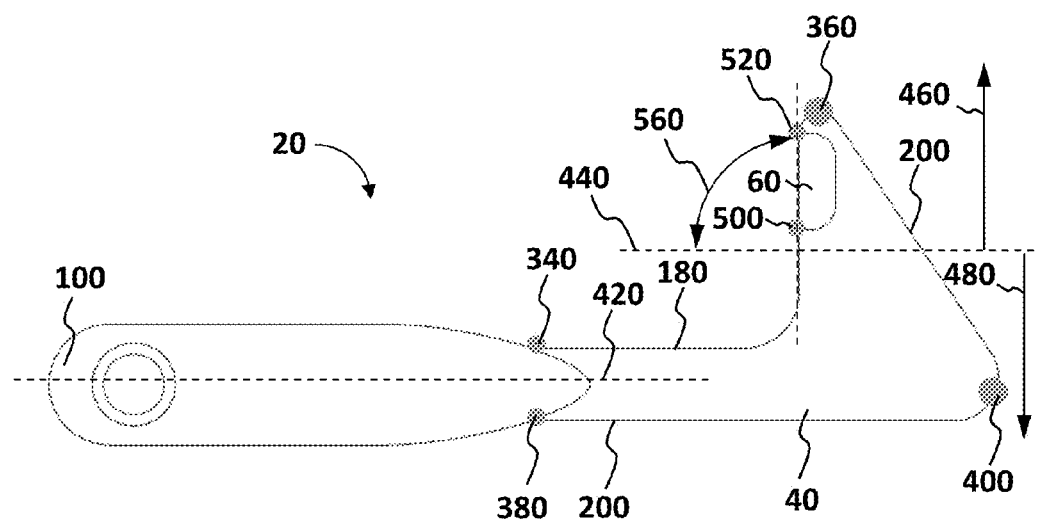
FIG. 4B is a diagrammatic side view of the second preferred embodiment of FIG. 4A.

FIG. 4A and FIG. 4B show a diagrammatic perspective view and side view, respectively, of a second preferred embodiment of a fishing lure 20 with tail wing feature 60. The wing angle 560 is shown as having a value of approximately 90 degrees, and both the leading edge 180 and trailing edge 200 both comprise a generally V-shaped profile, with the vertex of the V-shaped profile of the trailing edge 200 located generally at the second bend apex 400 within the second region 480. Note that although a small portion of each side face of the tail member 40 is located immediately rearward of the wing feature 60 in the first region 460, such a small amount of tail member surface area in FIG. 4B is not considered sufficient enough to interfere with the oscillating-enabling vortices that develop behind the wing feature 60. In other words, because such a small amount of tail member side surface area does not extend significantly rearward of the wing feature 60 in the first region 460, the lure 20 desirably does not experience substantial water flow across said small amount of tail member side surface area, and this still leaves the generally rearward space empty and free for the oscillation-producing trailing vortices to develop.

Figure 4C:
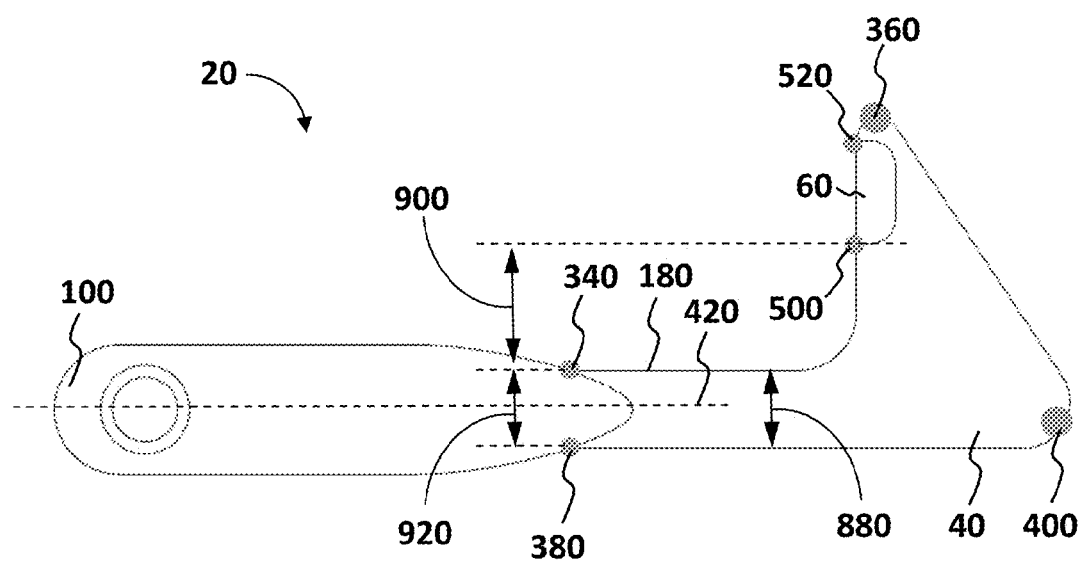
FIG. 4C is an identical side view like FIG. 4B, and illustrates an additional means for characterizing the desired geometric relationship between a tail member and corresponding wing feature.

FIG. 4C is an identical side view, or median-plane view, of the same preferred embodiment of FIGS. 4A-4B, and contains an alternative description of the preferred geometric relationship between a tail member 40 and corresponding wing feature 60. Specifically, a first dimension 880 is shown and is defined as the narrowest straight-line distance from any point along the leading edge 180, or between the first attachment point 340 and the first bend apex 360, and any point along the forward portion of the trailing edge 200, or between the second attachment point 380 and the substantial second bend apex 400, with said first dimension 880 being perpendicular to the frontal plane 420. A second dimension 900 is shown as the distance between the first attachment point 340, located at the forward end of the leading edge 180, and the first endpoint 500 of the wing feature 60. The second dimension 900 is generally parallel to the first dimension 880, or equivalently the second dimension 900 is also perpendicular to the frontal plane 420. In order to achieve the desired level of tail member oscillations—without causing the lure 20 to spiral or spin uncontrollably—and simultaneously enable the lure 20 to swim generally upwards or downwards based on an angler-chosen mounting orientation onto a pre-existing weighted hook 600, the second dimension 900 is desirably greater than the first dimension 880. Ideally, the second dimension 900 is at least 1.5 times greater than the first dimension 880 in order for the combination of tail member stiffness and wing feature size to enable the desired substantial oscillating behavior coupled with the rising and diving capability of the lure 20. In other words, if the first dimension 880 is too large relative to the second dimension 900, then the desired magnitude of side-to-side tail oscillations will not occur and/or the lure 20 will undesirably exhibit a spiraling or corkscrew-type motion when retrieved. In addition, a first dimension 880 that is too large relative to the second dimension 900 results in a stiffer tail member 40 that prevents the wing feature 60 from being able to be swept back sufficiently by incident hydrodynamic pressure 780 in order to enable the desired rising or diving capability of the lure 20.

Alternatively in FIG. 4C, a first width dimension 920 is again shown as the distance between the first attachment point 340 and second attachment point 380 of the tail member attachment area to the body member 80, with the first width dimension 920 also being perpendicular to the frontal plane 420. Compared to the first width dimension 920, the second dimension 900 is again the desirably larger dimension. More precisely, the second dimension 900 is desirably greater than the first width dimension 920. It should also be noted that similar to the dimensional relationship in FIG. 1D, in FIG. 4C the second width dimension 940 is also visibly greater than the first width dimension 920.

Figure 5A:
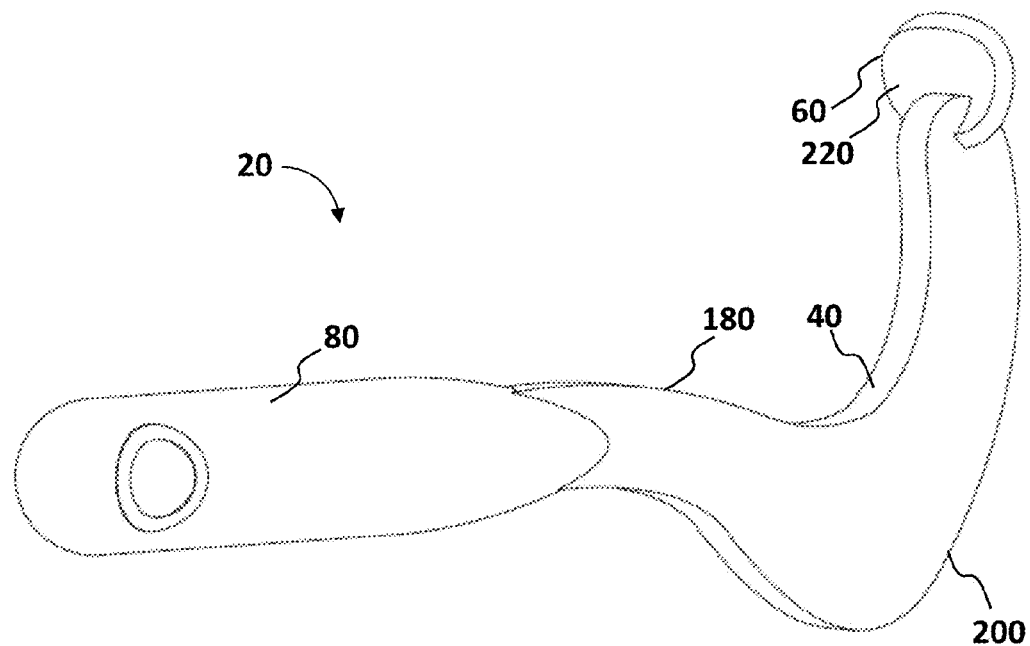
FIG. 5A is a diagrammatic perspective view of a third preferred embodiment of a fishing lure with tail wing feature, in accordance with the present invention.
Figure 5B:
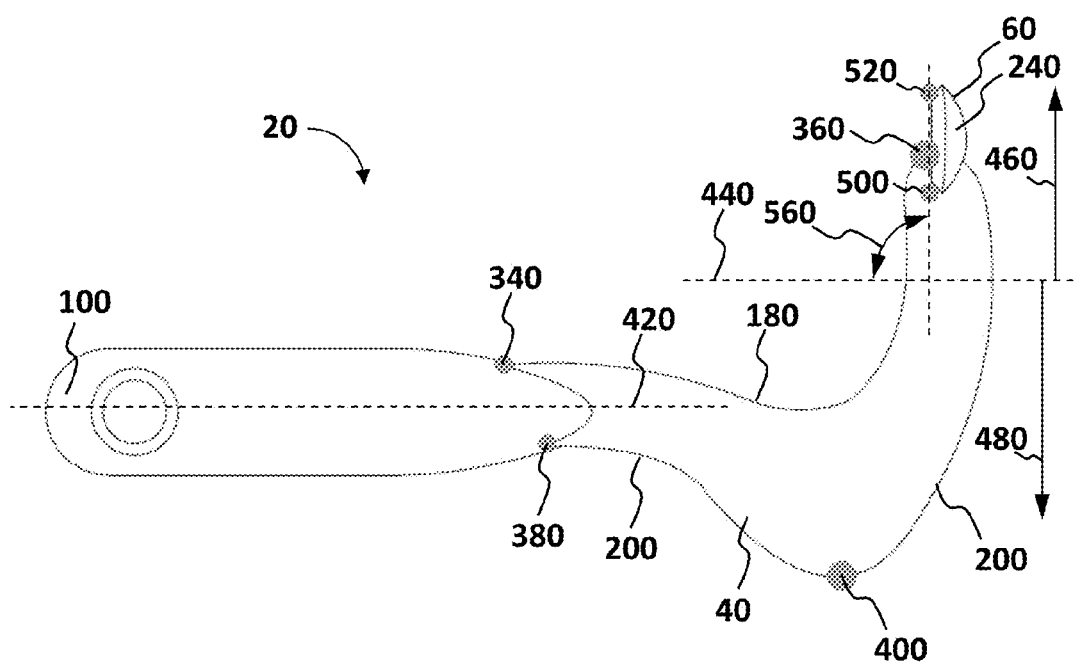
FIG. 5B is a diagrammatic side view of the third preferred embodiment of FIG. 5A.

FIG. 5A and FIG. 5B show a diagrammatic perspective view and side view, respectively, of a third preferred embodiment of a fishing lure 20 with tail wing feature 60. The wing angle 560 is again shown as having a value of approximately 90 degrees, and both the leading edge 180 and trailing edge 200 now comprise a generally U-shaped profile. It should be noted that the leading edge 180 or trailing edge 200 of any preferred embodiment can be generally U-shaped, generally V-shaped, generally C-shaped, or any combination thereof. In addition, the leading edge 180 or trailing edge 200 of any preferred embodiment can also comprise an undulating, wavy, serrated, sawtooth, notched, jagged, fringed, or similar type of profile at any portion along its length. It should be understood that in the case of a semi-circular or wholly C-shaped trailing edge 200, the second bend apex 400 is defined as being located at the general midpoint or halfway-point along the C-shaped trailing edge 200.

Figure 6A:
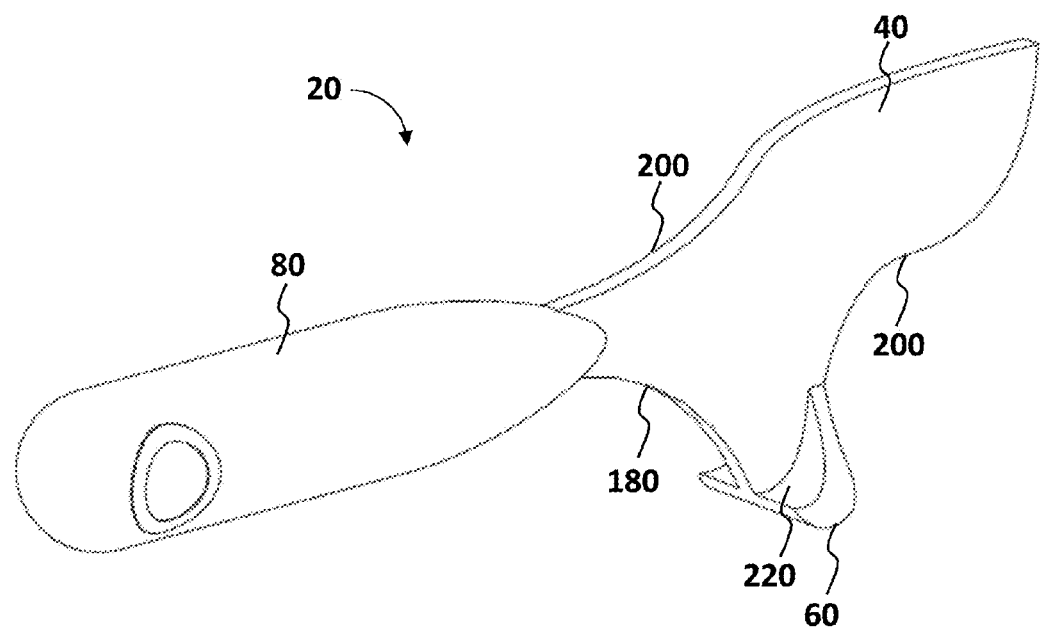
FIG. 6A is a diagrammatic perspective view of a fourth preferred embodiment of a fishing lure with tail wing feature, in accordance with the present invention.
Figure 6B:
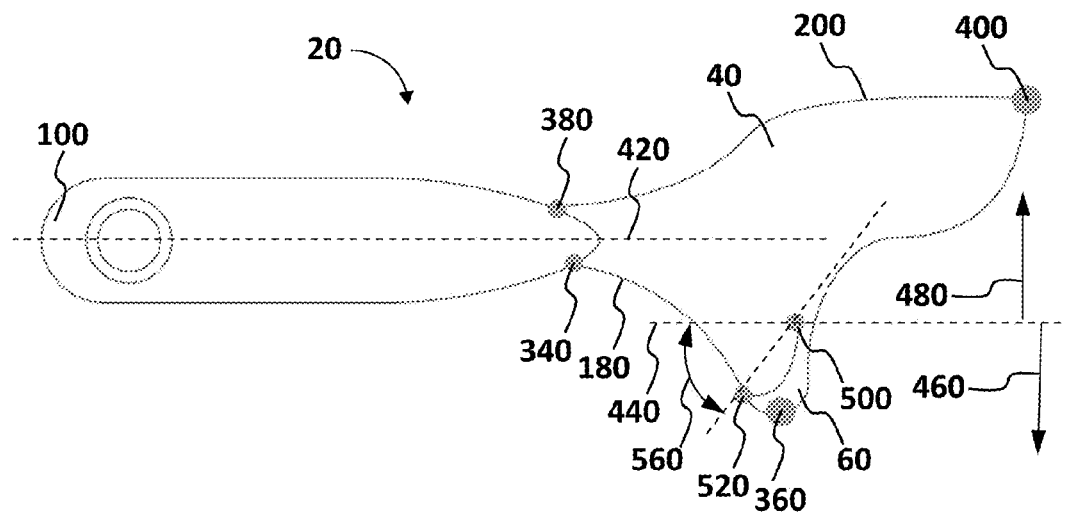
FIG. 6B is a diagrammatic side view of the fourth preferred embodiment of FIG. 6A.

FIG. 6A and FIG. 6B show a diagrammatic perspective view and side view, respectively, of a fourth preferred embodiment of a fishing lure 20 with tail wing feature 60. As in all preferred embodiments, the leading edge 180 again extends from a first attachment point 340 on the body member 40 and generally increases in distance away from the frontal plane 420 in order to terminate at a first bend apex 360 located generally adjacent to the wing feature 60. The wing feature 60 is again generally contained within the first region 460, with the dividing plane 440 and first region 460 being defined in the same manner as in all other preferred embodiments. The trailing edge 200 forms the remaining shape of the tail member 40 and again contains a substantial second bend apex 400 located substantially away from the first bend apex 360. The wing angle 560 is shown smaller than 90 degrees in this preferred embodiment, similar to the acute wing angle 560 shown in FIG. 1D.

It should be understood that there are many obvious variations of the preferred embodiments described herein. A tail member can be made from a flexible material and then merged with an inflexible body member through means known in the art for joining two dissimilar materials. The body member and/or tail member can be comprised of a combination of different flexible materials and define a modular construction of the lure. For example, flexible materials that can be used to construct a portion of or all of the lure include open cell foam, closed cell foam, leather, felt, fabric, heat shrink tubing, thin sheet metal, natural rubber, synthetic rubber, thermoplastic elastomer, an elastomeric emulsion polymer, a thermoplastic vulcanizate, thermoplastic polyurethane, a thermoplastic olefin, thermoplastic polymer, plastisol, and plastisol-like materials. It is also obvious that elastomeric materials having different durometers, or hardness values, can be combined together to form a portion of the lure or all of the lure. For example, it may be desired to have a more rigid rubbery tail member coupled to a much softer rubbery body member.

The lure can contain elements for attracting fish, such as any anatomical feature of a small fish, amphibian, mammal, reptile, mollusk, crustacean, bird, or insect. The flexible lure can contain further elements for attracting fish in the form of metallic or plastic reflective elements, glitter, salt, garlic, coffee, or other similar visual or scented fish attractants. Also, any surface of the body member, tail member, or wing feature can comprise a desired texture or pattern in order to provide a more lifelike feel and appearance to a curious fish.

The leading edge or trailing edge of a tail member can have a webbed-type edge shape that can expand under hydrodynamic forces or stretch more effectively than a curved edge shape solely consisting of a constant thickness. Alternatively, the leading edge or trailing edge of a tail member can have a wavy s-type edge shape that meanders on either side of the median plane. Such a webbed leading edge can allow the leading edge to be pushed back or extend more rearward as incident hydrodynamic pressure presses down onto the wing feature in a direction towards the second region. It should be obvious that the wing feature can extend out or protrude on only one side of the median plane of the tail member, in addition to extending or protruding out both sides of the median plane of the tail member like shown in all preferred embodiments contained herein. Also, more than one wing feature can be present at the same general location on the lure.

A tail member can have one or more through-holes or openings in order to enhance the gurgling or splashing sounds made by the lure as it moves through water or across the top water surface. Multiple tail members can extend out from multiple locations along a single body member. Although most of the leading edge of the tail member generally has the same thickness as most of the trailing edge of the tail member, a small portion of the tail member can be made thicker than the surrounding portions of the tail member. For example, an area adjacent to the second bend apex in the second region of the tail member can be made locally thicker in order to create more momentum of the oscillating tail member near the second bend apex.

While certain preferred embodiments have been described and shown in the accompanying drawings, it is to be understood that such preferred embodiments are merely illustrative of, and not restrictive on, the broad invention. It is to be understood that this invention shall not be limited to the preferred embodiments shown and described, as various modifications or changes will be apparent to those of ordinary skill in the art without departing from the spirit and scope of the preferred embodiments as claimed. It is intended that the scope of the invention be defined by the following claims and their equivalents.

What is claimed is:

1. A fishing lure comprising:
an elastomeric body member, wherein said body member has a leading end and a trailing end and at least one elastomeric tail member extending from said body member;
wherein said tail member has a first side face and a opposite side face, wherein a median plane divides said tail member into two generally equal portions;
wherein a leading edge of said tail member extends from a first attachment point on said body member and has a generally steepening profile terminating at a first bend apex;
wherein a trailing edge of said tail member extends from a second attachment point on said body member and terminates at said first bend apex;
wherein a thickness dimension of said tail member along most of said leading edge is generally equal to a thickness dimension of said tail member along most of said trailing edge, wherein each of said thickness dimensions is measured generally perpendicular to said median plane;
wherein a frontal plane generally passes through said leading end and also passes generally midway between said first attachment point and said second attachment point, wherein said frontal plane is perpendicular to said median plane;
wherein a dividing plane is parallel to said frontal plane and passes midway between said first bend apex and said frontal plane, wherein said dividing plane divides said lure and surrounding water into a first region and a second region of three dimensional space, wherein said frontal plane lies within said second region;
wherein said trailing edge has a generally v-shaped profile when said lure is viewed in said median plane, wherein the vertex of said v-shaped profile is generally located within said second region;
wherein a first width dimension of said tail member is defined as a straight-line distance between said first attachment point and said second attachment point; said first width dimension being greater than said thickness dimension;
wherein a second width dimension of said tail member is defined as a straight-line distance between said leading edge and said trailing edge at a location coincident with said dividing plane;
wherein said second width dimension is greater than said first width dimension;
wherein a wing feature is positioned generally near said first bend apex between said leading edge and said trailing edge, wherein said wing feature is solely located within said first region, wherein said wing feature generally extends outward in a perpendicular fashion from said median plane and comprises a generally flat or concave leading face, wherein the intersection of said leading face and said median plane forms a line comprising a first endpoint and a second endpoint, wherein said first endpoint is located generally closer to said frontal plane than said second endpoint;

wherein a wing plane extends through said first endpoint and said second endpoint and is perpendicular to said median plane, wherein an angle between said wing plane and said dividing plane is generally 120 degrees or smaller when said lure is at rest, wherein said angle is generally located within said first region, wherein said angle is generally open towards said leading end;

wherein said second endpoint of said wing feature is located generally further away from said dividing plane than any other portion of said tail member contained within said first region, as measured by a straight line distance perpendicular to said dividing plane;

wherein hydrodynamic pressure incident on said leading face of said wing feature bends said tail member in a direction generally towards said second region as said lure is pulled forward in water; and wherein said tail member moves with an oscillating-type motion as said lure is pulled forward in water.

2. The fishing lure in accordance with claim 1, wherein said body member or said tail member further comprises at least one element for attracting fish.

3. The fishing lure in accordance with claim 2, wherein said element for attracting fish is any anatomical feature of a small fish, amphibian, mammal, reptile, mollusk, crustacean, bird, or insect.

4. The fishing lure in accordance with claim 1, wherein said body member and said tail member are comprised of different durometers.

5. The fishing lure in accordance with claim 1, wherein said lure is comprised of more than one flexible material.

6. The fishing lure in accordance with claim 1, wherein at least one opening extends wholly through said tail member.

7. A fishing lure comprising:

a body member, wherein said body member has a leading end and a trailing end and at least one elastomeric tail member extending from said body member;

wherein said tail member has a first side face and a opposite side face, wherein a median plane divides said tail member into two generally equal portions;

wherein a leading edge of said tail member extends from a first attachment point on said body member and has a generally steepening profile terminating at a first bend apex;

wherein a trailing edge of said tail member extends from a second attachment point on said body member and terminates at said first bend apex;

wherein a thickness dimension of said leading edge is generally equal to a thickness dimension of said trailing edge, wherein each of said thickness dimensions is measured generally perpendicular to said median plane;

wherein a frontal plane generally passes through said leading end and also passes generally midway between said first attachment point and said second attachment point, wherein said frontal plane is perpendicular to said median plane;

wherein a dividing plane is parallel to said frontal plane and passes midway between said first bend apex and said frontal plane, wherein said dividing plane divides said lure and surrounding water into a first region and a second region of three dimensional space, wherein said frontal plane lies within said second region;

wherein a first width dimension of said tail member is defined as a straight-line distance between said first attachment point and said second attachment point; said first width dimension being greater than said thickness dimension;

wherein a second width dimension of said tail member is defined as a straight-line distance between said leading edge and said trailing edge at a location coincident with said dividing plane;

wherein said second width dimension is greater than said first width dimension;

wherein a wing feature is positioned generally near said first bend apex between said leading edge and said trailing edge, wherein said wing feature is solely located within said first region, wherein said wing feature has a leading face generally perpendicular to said median plane, wherein the intersection of said leading face and said median plane forms a line comprising a first endpoint and a second endpoint, wherein said first endpoint is located generally closer to said frontal plane than said second endpoint;

wherein said second endpoint of said wing feature is located generally further away from said dividing plane than any other portion of said tail member contained within said first region, as measured by a straight line distance perpendicular to said dividing plane;

wherein hydrodynamic pressure incident on said leading face of said wing feature bends said tail member in a direction generally towards said second region as said lure is pulled forward in water; and wherein said tail member moves with an oscillating-type motion as said lure is pulled forward in water.

8. The fishing lure in accordance with claim 7, wherein said body member or said tail member further comprises at least one element for attracting fish.

9. The fishing lure in accordance with claim 8, wherein said element for attracting fish is any anatomical feature of a small fish, amphibian, mammal, reptile, mollusk, crustacean, bird, or insect.

10. The fishing lure in accordance with claim 7, wherein said body member and said tail member are comprised of different durometers.

11. The fishing lure in accordance with claim 7, wherein said leading face of said wing feature has a generally flat or concave shape.

12. The fishing lure in accordance with claim 7, wherein at least one opening extends wholly through said tail member.

13. A fishing lure, comprising:

a body member, wherein said body member has a leading end and a trailing end and at least one flexible tail member extending from said body member, wherein a median plane divides said tail member into two generally equal portions;

wherein a leading edge of said tail member extends from a first attachment point on said body member and terminates at a first bend apex;

wherein a trailing edge of said tail member extends from a second attachment point on said body member and terminates at said first bend apex;

wherein a frontal plane generally passes through said leading end and also passes generally midway between said first attachment point and said second attachment point, wherein said frontal plane is perpendicular to said median plane;

wherein a dividing plane is parallel to said frontal plane and passes midway between said first bend apex and said frontal plane, wherein said dividing plane divides said lure and surrounding water into a first region and a second region of three dimensional space, wherein said frontal plane lies within said second region;

wherein said trailing edge has a generally v-shaped profile when said lure is viewed in said median plane, wherein the vertex of said v-shaped profile is generally located within said second region;

wherein a first width dimension of said tail member is defined as a straight-line distance between said first attachment point and said second attachment point; said first width dimension being greater than said thickness dimension;

wherein at least one wing feature is positioned generally adjacent to said first bend apex at a location between said leading edge and said trailing edge, wherein said wing feature is generally located within said first region, wherein said wing feature comprises a leading face designed and dimensioned to disrupt the flow of water around said wing feature;

wherein said first bend apex is located generally further away from said dividing plane than any other portion of said tail member contained within said first region, as measured by a straight line distance perpendicular to said dividing plane; and wherein said tail member moves with an oscillating-type motion as said lure is pulled forward in water.

14. The fishing lure in accordance with claim 13, wherein said body member or said tail member further comprises at least one element for attracting fish.

15. The fishing lure in accordance with claim 14, wherein said element for attracting fish is any anatomical feature of a small fish, amphibian, mammal, reptile, mollusk, crustacean, bird, or insect.

16. The fishing lure in accordance with claim 13, wherein said body member and said tail member are comprised of different durometers.

17. The fishing lure in accordance with claim 13, wherein said leading face of said wing feature has a generally flat or concave shape.

18. The fishing lure in accordance with claim 13, wherein at least one opening extends wholly through said tail member.

19. The fishing lure in accordance with claim 13, wherein said leading edge or said trailing edge has a webbed-type shape.

20. The fishing lure in accordance with claim 13, wherein at least one first portion of said tail member is thicker than a surrounding second portion of said tail member.

* * * * *